United States Patent
Kawabe et al.

[15] 3,673,444
[45] June 27, 1972

[54] ROTARY ELECTRIC MACHINE

[72] Inventors: Ushio Kawabe, Nishitama; Hiroshi Kimura, Kita; Hiroshi Tomeoku, Hachioji; Toshio Doi, Minamitama, all of Japan

[73] Assignee: Hitachi, Ltd., Chiyoda-ku, Tokyo, Japan

[22] Filed: Oct. 9, 1970

[21] Appl. No.: 79,546

[30] Foreign Application Priority Data
Oct. 9, 1969  Japan....................44/80794

[52] U.S. Cl..................................310/10, 310/266
[51] Int. Cl.......................................H02k 9/00
[58] Field of Search..................310/10, 40, 52, 266

[56] References Cited

UNITED STATES PATENTS

| | | | |
|---|---|---|---|
| 3,564,307 | 4/1971 | Kawabi et al. | 310/10 |
| 3,026,151 | 3/1962 | Buchhold | 310/10 |
| 3,261,210 | 7/1966 | Buchhold | 308/10 x |

*Primary Examiner*—D. X. Sliney
*Attorney*—Craig, Antonelli & Hill

[57] ABSTRACT

A rotary electric machine having a superconducting rotor and bearings, which utilize the magnetic solid property of an inhomogeneous hard superconducting material, for forming an a.c. generator or motor.

11 Claims, 6 Drawing Figures

INVENTORS
USHIO KAWABE, HIROSHI KIMURA, HIROSHI TOMEOKU
AND TOSHIO DOI
BY
Craig, Antonelli, Stewart + Hill
ATTORNEYS

ROTARY ELECTRIC MACHINE

This invention relates to rotary electric machines, and more particularly, it relates to a superconducting rotary electric machine having superconducting magnetic floating bearings.

Insofar as this disclosure of the present invention is concerned, a rotary electric machine refers to both an a.c. generator and a.c. motor. In copending application Ser. No. 843,555, filed July 22, 1969, in the name of U. Kawabe et al., three types of superconducting a.c. generators have been proposed.

Two of these generators utilize the magnetic shielding property of a plurality of parallelly spaced plates of inhomogeneous hard superconducting material to generate an alternating voltage. The principle of these generators will become apparent from the detailed description of the present invention given hereinafter.

These generators have a pair of mechanical bearing means attached to respective ends of the rotor axis, located at the outside and the inside of the cryogenic means, respectively. In these instances, the outside bearing means are conventional ball-bearings which are attached to the outer supporting member for supporting the radial component force, and the inside bearing members for supporting the thrust component force are composed of bearing cases which are attached to the inner supporting member and are made from a material having a low coefficient of cubical expansion at low temperatures, such as metal. The bearings which are retained therein are made from a material having a high coefficient of cubical expansion and a low coefficient of friction at low temperatures, such as flurionated resin.

When these inside bearings are brought to extremely low temperatures (near 4.2° K), a gap between the bearing member and the bearing is created by the difference in contraction between the members. Liquid helium is introduced into this gap and serves as a lubricant. But it became evident from the experiment that the mechanical heat loss of these inside bearings occupies 58 percent in the total power loss of the generator. Consequently, it has been desired to develop a superconducting a.c. generator which has bearings capable of reducing the aforesaid mechanical loss and thereby raising the electrical efficiency.

In copending application Ser. No. 57,240, filed July 23, 1970, in the name of U. Kawabe et al., the magnetic floating device using a hard superconductor has been proposed there.

This magnetic floating device uses the magnetic shielding property of a plurality of parallelly spaced plates of inhomogeneous hard superconductor to lift or float an object in the air by virtue of magnetic force.

The rotary electric machine of the present invention utilizes the principle of this magnetic floating device for its non-contact bearings.

The present invention will become fully understood from the detailed description hereinbelow and the accompanying drawings which are given by way of illustration only and thus are not limitative of the present invention and wherein:

FIGS. 3a and 3b are views of an embodiment of the present invention, FIG. 3a being a top plan view and FIG. 3b being a sectional view taken on the line IIIb—IIIb in FIG. 3a;

FIGS. 4a and 4b are views of another embodiment of the present invention, FIG. 4a being a top plan view and FIG. 4b being a sectional view taken on the line IVb—IVb in FIG. 4a.

Figure 1:
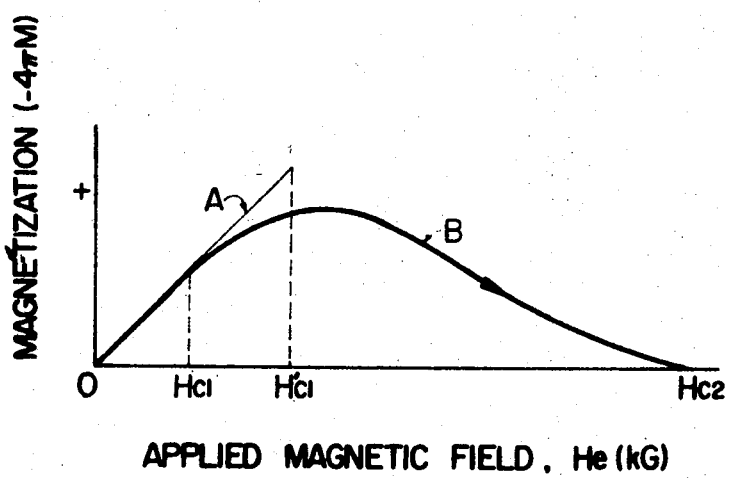
FIG. 1 illustrates a pair of curves on which magnetization ($-4\pi M$) is plotted against applied magnetic field He (in kilooersteds), two curves representing the results typical of tests of "soft" and "hard" superconducting materials.

The magnetic characteristics of "soft" and "hard" superconducting materials are illustrated in FIG. 1, wherein Curve A represents a "soft" material and Curve B represents a "-hard" material.

In the case of a "soft" material, the magnetization ($-4\pi M$) is shown to increase in proportion to the increase in the applied magnetic field He until the level of that field reaches the value designated $H'c_1$ whereupon the superconducting state is instantly quenched so that magnetization becomes zero and the material returns to its normal conducting state. If the temperature is maintained below the superconducting critical temperature of the material and the applied magnetic field is gradually diminished to the $H'c_1$ point, the superconducting state is instantly re-established in the material and the magnetization further decreases with the applied magnetic field resulting in a precise retracing of Curve A to the origin. The value $H'c_1$ is known as the lower critical field, and the region He $H'c_1$ is the perfect diamagnetic region or Meissner region. In this region, a current flows through the surface layer of the soft superconducting material at a level of about several thousand Angstroms in thickness. As a result, the external magnetic flux does not penetrate into the soft superconductor due to the shielding effect of the outer current carrying layer, with the result that its internal magnetic field is maintained at zero.

If an object whose internal magnetic field is zero is placed in a divergent magnetic field, a certain force is exerted on the object to such an extent that the object can be lifted toward the direction where the gradient of magnetic flux decreases. This means that the foregoing principle may be applied in the manufacture of mechanically contactless bearings, cushions, etc.

With a magnetic floating device which utilizes the Meissner effect of soft superconductor material, as described above, the maximum lifting force, which is expressed as $H'c^2_1/8\pi$-dyne/cm$^2$, is limited by the intensity of the lower critical magnetic field $H'c_1$ and cannot be increased beyond a certain value since $H'c_1$ is relatively small.

The present invention, by contrast, employs a plurality of parallelly spaced plates of inhomogeneous hard superconductor as the bearings of the superconducting a.c. generator and takes advantage of the magnetic shielding effect against the external magnetic field He between the lower critical magnetic field $Hc_1$ and the upper critical magnetic field $Hc_2$, whereby the device can gain a lifting force nearly several thousand times greater than those of the conventional devices.

In the case of "hard" superconductive material, the magnetization characteristic is as shown in Curve B. The magnetization substantially follows the first portion of Curve A but at an applied magnetic field value well below the lower critical magnetic field $Hc_1$ exhibits a diminishing rate of increase in magnetization. This occurs at the point marked $Hc_i$, signifying that this is where magnetic flux penetration into the superconductor first takes place. Flux penetration increases as the applied magnetic field He is increased until the superconducting state is finally completely quenched at the upper critical magnetic field $Hc_2$ and at the same time magnetization gradually decreases to zero after it reaches the maximum value. At that upper critical magnitude of applied magnetic field, penetration of the magnetic flux into the superconductor is complete and no residual portion of the body of this material remains superconducting. Thus, while the region where He<$Hc_i$ is called the Meissner region, as referred to above, the region where $Hc_1$ < He < $Hc_2$ is called the "mixed state" region. In the latter region, a dilute magnetic flux space is produced within a hard superconductor by virtue of phenomenon quite different from the Meissner effect. Namely, the magnetic flux penetrates into the depth of the hard superconductor through its surface which balances the flux pinning forces due to the inhomogeneous portions such as dislocations, precipitations and other crystal defects with the Lorentz' force induced by a magnetic flux from the applied magnetic field He. As a consequence, an induced current flows through the portions into which the magnetic flux has penetrated. Any further penetration of magnetic flux into the hard superconductor is prevented by this induced current and a remarkably diluted magnetic flux space is formed inside the superconductor. In this case, the penetration depth of the magnetic flux in the hard superconductor depends on the intensity of the applied magnetic field, the depth being usually about $10^6$ times greater than the depth of the surface layer through which a current flows by the Meissner effect. In this way, the Meissner effect creates a space of no magnetic flux in a superconductor, whereas the magnetic shielding effect produces a dilute magnetic flux space in a superconductor of the same material. Thus, the two types of superconductors have entirely dissimilar magnetic characteristics, but, in either case, the superconductor when placed in a magnetic field having a uniform gradient will be subjected to a magnetic force in the direction where the magnetic field decreases. It may be added that homogeneous hard superconductors are rather undesirable for the practice of this invention because they permit penetration of the magnetic flux from an applied magnetic field of fairly low intensity because of the absence of the aforesaid pinning forces and fail to achieve a sufficient magnetic shielding effect.

This invention takes advantage of the shielding property for lifting the rotor of the generator generating an a.c. voltage.

As stated above, if the inhomogeneous hard superconductor is placed in the divergent applied magnetic field He, where $Hc_1 < He < Hc_2$, the dilute magnetic flux space, of which the field strength is $H'$, is formed inside it. In that case, the boundary of the space is subjected to the magnetic force which is expressed as $(1-\gamma)He^2/8\pi$ dyne/cm² and the superconductor is lifted in the direction of a decreasing magnetic field as a result of those resultant forces. Here, the factor $\gamma$ is called the magnetic shielding factor. This factor is the physical quantity which depends on the metallurgical microstructures, i.e., the distribution of dislocations, precipitations, other crystal defects and the geometrical constitution of the superconductor, and is given by the ratio of the inside magnetic field of the dilute magnetic flux space $H'$ against the applied magnetic field He, i.e., $H'/He$. The upper critical magnetic field $Hc_2$ of the inhomogeneous hard superconductor has a value about 100 times as great as that of an ordinary soft superconductor. Moreover, suitable selection of the material makes it possible to obtain a $\gamma$ value very close to zero. With all these factors combined, the magnetic shielding property of the inhomogeneous hard superconductor can attain a lifting force nearly several thousand times as great as those conventional lifting devices which utilize the Meissner effect.

More in detail, the lifting force $\vec{F}$ owing to the interaction between the above-mentioned divergent magnetic field He and the dilute magnetic flux space is given by the formula $$\vec{F} = -\mathrm{grad}\left(\iiint_{(V)} (1-\gamma)He^2/8\pi dv\right)$$

$$= \iiint_{(V)} (1-\gamma)\vec{He} \cdot (-\mathrm{grad}\ He) dv$$

where the V is the volume of the dilute magnetic flux space. Accordingly, the direction of the force of the applied magnetic field on the superconductor is that which will produce a decreasing of the magnetic flux that penetrates the place to be occupied by the superconductor. As a result, the inhomogeneous hard superconductor moves in the direction of the decreasing gradient of the applied magnetic field which penetrates through it and will stand still at the place where the produce of the applied magnetic field and its gradient becomes minimum.

Figure 2:
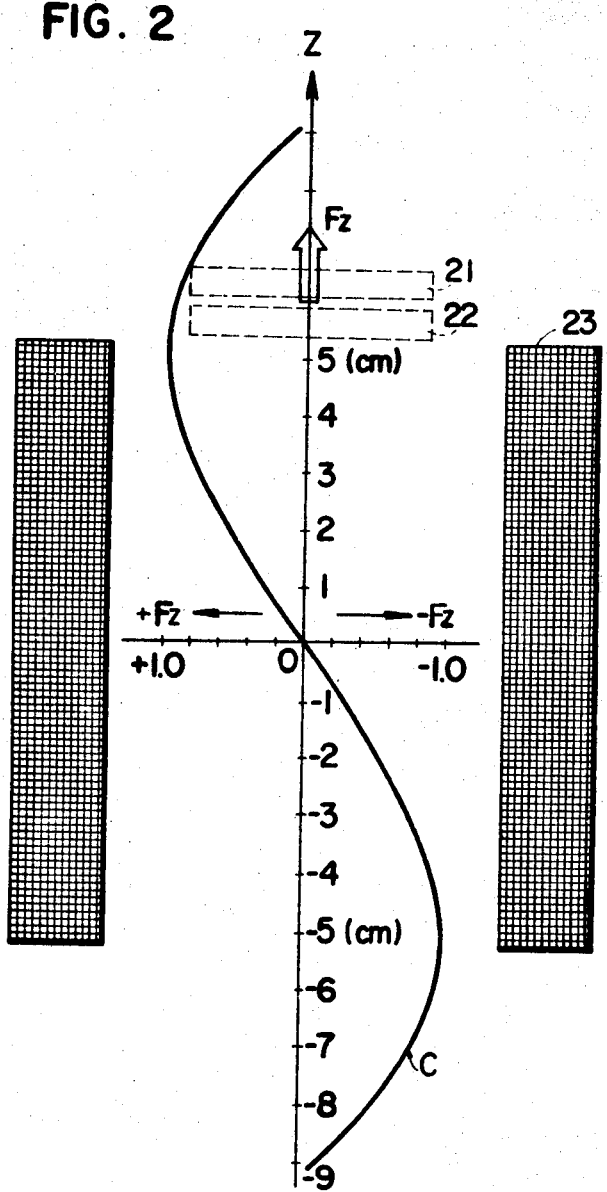
FIG. 2 is a schematic diagram illustrating the principle of the magnetic floating bearing utilized by the present invention.

Referring to FIG. 2, a pair of discs 21 and 22 of an inhomogeneous hard superconductor is parallelly mounted on a rotor axis and is disposed in concentric relation with the vertical superconducting solenoid 23. If they are immersed in liquid helium and a persistent current is applied to the solenoid 23 for establishing an applied magnetic field He of a magnitude falling in the mixed state region, the dilute magnetic flux space, in this case, is formed between the two discs 21 and 22 by the magnetic shielding effect of the discs and the pair of discs is subjected to a magnetic lifting force in the direction of the axis of the solenoid 23. The distribution of this magnetic lifting force Fz is shown in Curve C in FIG. 2, wherein the magnetic lifting force Fz is normalized by its maximum value.

From FIG. 2, it is clear that a lifting force acts on the pair of discs at the upper half of the solenoid 23, a descending force acts on the pair of discs at the lower half of the solenoid 23, both forces balance at the center of the solenoid 23 and both forces become maximum at respective ends of the solenoid 23. The equilibrium of this lifting force results from the balanced relation in the radial direction of the solenoid 23 owing to the axial symmetry of the applied magnetic field He and the conditionally stabile relation in the gravity direction, i.e., the axial direction of the solenoid 23, results from the balance with gravity of the lifting body. It is understood that this phenomenon is quite opposite to the repulsive relation which exists between a divergent magnetic field coil and a ferromagnetic body. The present invention utilizes the above-mentioned lifting phenomena produced as a result of the magnetic shielding effect of a plurality of parallelly spaced plates of an inhomogeneous hard superconductor.

Figure 3A:
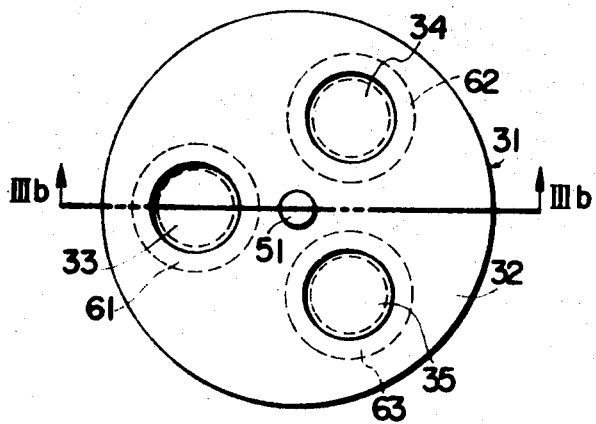
Figure 3B:
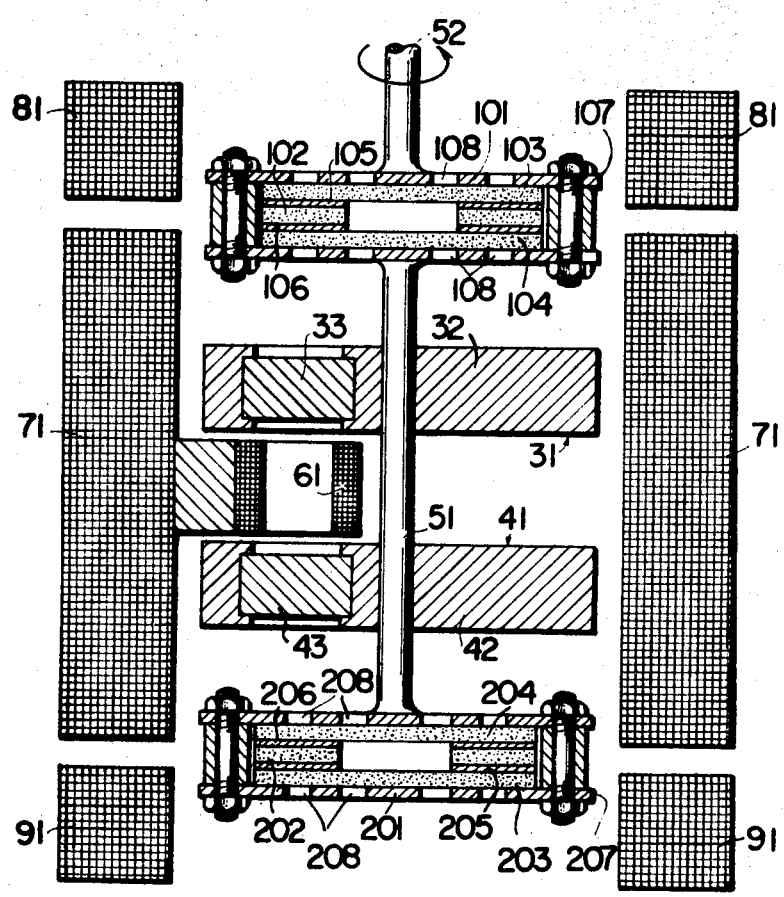

Referring now to FIGS. 3a and 3b, which illustrate a vertical type a.c. generator, the rotor 31 is composed of the electric insulating disc 32 and the three superconducting magnetic poles 33, 34 and 35 which are mounted on the corners of an imaginary triangle on the disc 32 symmetrical to the axis of rotation. Also, the rotor 41 has the same structure. The rotors 31 and 41 are parallelly disposed with a predetermined gap and are fixed on an inner shaft 51 in such a manner that the magnetic poles of the rotors 31 and 41 are opposed to each other. The cylindrical armature coils 61, 62, and 63 are disposed directly beneath the magnetic poles 33, 34 and 35 in the space defined between the rotors 31 and 41, respectively. These coils 61, 62 and 63 are supported by suitable supporting means in the space between the rotors 31 and 41. The cylindrical superconducting main field coil 71 co-axially surrounds the rotors 31 and 41 and serves to establish a magnetic field which is transverse to the rotor faces. The cylindrical superconducting supplemental field coils 81 and 91, which have the same diameter as the main field coil 71, are placed at the upper and lower ends of the main field coil 71 so as to provide a gap therebetween. The superconducting bearing means 101 and 201 are disposed in the areas of the gaps between the main field coil 71 and the supplemental field coils 81 and 91, respectively, and are fixed on respective ends of the inner shaft 51. The above-mentioned assembly of the field coils, rotors and bearings is placed in the cryostat (not shown). The outer shaft 52 is fixed at the center of the upper surface of the upper superconducting bearing member 101 and is driven, for example, by a d.c. motor outside the cryostat.

The superconducting magnetic poles are prepared by mutually piling up 100 sheets of niobium and tin plate, each measuring 17.8 mm in diameter and 40 microns in thickness, and subjecting them to diffusion heat treatment in vacuum of $2 \times 10^{-6}$ Torr at 1,000° C. for 5 hours, thereby forming the body of the layer by layer structure of $Nb_3Sn - Nb - Nb_3Sn - - - -$, where the thickness of the body and the $Nb_3Sn$ layer formed is about 7 mm and 30 microns, respectively. The electrical insulating discs 31 and 41 are made from Bakelite (phenol-formaldehyde resin).

The armature coils 61, 62 and 63 are wound on a Bakelite bobbin with 0.4 mm-diameter enamel-insulated copper wire in many layers, each having 200 turns, and a copper foil having a thickness of 50 microns is inserted between respective adjacent layers so that the layers do not pile up at both ends and to increase the cooling effect of the coils by the coolant (liquid helium). These coils 61, 62 and 63 have nearly the same diameter and are connected in series.

A 45 mm-outer diameter, 30 mm-inner diameter, 5 mm-thick sintered $Nb_3Sn$ disc 102 is placed between two 45 mm-diameter, 5 mm-thick sintered $Nb_3Sn$ discs 103 and 104 and spacers 105 and 106 are interposed therebetween. The spacers 105 and 106 have grooves for coolant passage on both surfaces. These sintered $Nb_3Sn$ discs and spacers are supported in parallel relation with each other by the supporting member 107. The inner and outer surfaces of the supporting member 107 contain a suitable number of holes 108 for coolant passage. The lower bearing member 201 has the same structure as the upper bearing member 101, and both ends of the inner shaft 51 are fixed on the center of the inner surfaces of the supporting members 101 and 201, respectively. Further, an end of the outer shaft 52 is fixed on the center of the outer surface of the upper supporting member 101.

The upper bearing means 101 is disposed so as to be located at the place where the median plane between the main field coil 71 and the upper supplemental field coil 81 passes between the sintered $Nb_3Sn$ discs 103 and 104 in the upper bearing member 107. The lower bearing means 201 is also constructed as above-described.

The liquid helium is introduced into the cryostat and the assembly of the rotors, bearings and field coils is cooled to 4.2° K so as to bring all the superconductive elements of the combination to their superconducting state. Current is supplied to the main field coil 71 and the supplemental field coils 81 and 91, which are series connected, and the fixed applied magnetic field He below $Hc_2$ is applied to the rotors 31 and 41. Then, the rotors 31 and 41 are driven by a d.c. motor at a fixed rotating speed. The dilute magnetic flux space is formed in the space between the confronted magnetic poles 33 and 43, 34 and 44, and 35 and 45, respectively, by the above-mentioned shielding effect of the inhomogeneous hard superconductor. Therefore, when the armature coils 61, 62 and 63 are placed in the spaces between the magnetic poles 33 and 43, 34 and 44, and 35 and 45, they are scarcely interlinked by the magnetic flux. Consequently, an a.c. voltage is induced across the armature coils 61, 62 and 63 with the rotation of the rotors 31 and 41.

In one example of the generator constructed in accordance with the present invention, the main field coil 71 is an 80 mm-bore, 25 kG superconducting solenoid and the supplemental field coils 81 and 91 are 80 mm-bore, 10-kG superconducting solenoids. These coils are series connected and a persistent current is supplied to these coils.

When the rotors 31 and 41 of the above-described generator were operated at 1,000 r.p.m. at 25-kG with a resistance load, the effective voltage, the effective current and the power factor at 50 Hz were 26.3 V, 5A and 100 percent, respectively. The output power generated was 132W. The superconducting rotors 31 and 41 were very stable both in the gravity direction and the radial direction to the rotation of 1,000 r.p.m. The power loss due to the superconducting bearing means 101 and 201 was about 20 percent of the mean value of the thermal power loss in the stationary state of the cryostat and according to this, the electrical efficiency of this generator was increased to about 93 percent. The electrical efficiency of a similar a.c. generator with mechanical bearings which was developed previously by the inventors was about 89 percent. This value is considerably higher than that of the conventional a.c. generator of the same scale. Accordingly, it will be understood that a remarkable improvement in the efficiency of our generator was caused by the following two facts. Namely, (1) the conventional mechanical bearings were replaced with superconducting non-contact bearings and (2) the uniformity of the applied magnetic field in the region of the superconducting rotors was improved by the disposition of the supplemental field coils at the upper and lower sides of the main field coil. Also, the very good stability in the axial and radial directions of the rotor against its rotation is due to the fact that a leakage magnetic field is brought about through the respective gaps by the disposition of the supplemental field coils at the upper and lower sides of the main field coil with the gaps. As a result of this, divergent magnetic fields turning in mutually opposite directions are created in the vicinity of the gaps. In this case, the bearings are subjected to the action of the reversely directed magnetic forces, which suppress more tightly the movement of the bearings than in the case of use of a main field coil only. In the case of the main field coil only, the stability is somewhat inferior to the above-mentioned case but the efficiency is not varied so much.

Moreover, the a.c. generator of the invention can be remarkably reduced in size as it uses the field coil for the rotors and bearings in common.

Also, it is clear that in FIG. 3 if d.c. and a.c. current is caused to flow in the field coils and the armature coils, respectively, this apparatus acts as a.c. motor.

The above-mentioned superconducting magnetic pole can also be constructed as a monolayer structure instead of the multilayer structure as described above. In either case, the magnetic pole is required to have a structure which is capable of forming a dilute magnetic flux space having a dimension which is sufficient to cover the armature coil.

Figure 4A:
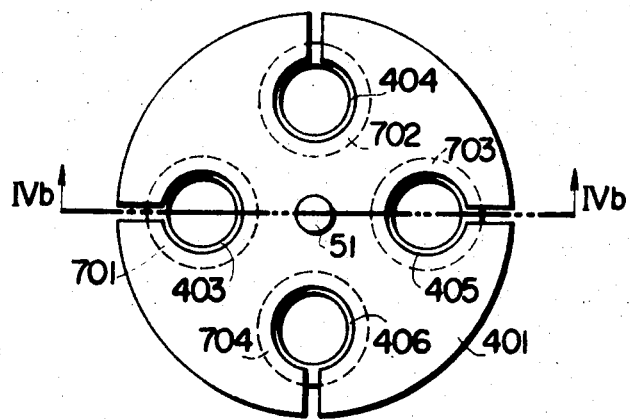
Figure 4B:
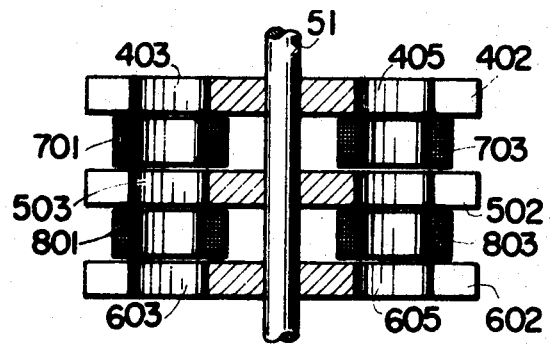

The afore-said superconducting rotor composed of the electrical insulating disc and the superconducting magnetic pole can be replaced by the rotor as shown in FIGS. 4a and 4b. The superconducting rotor 402 is composed of the disc of an inhomogeneous hard superconducting material, for example, Nb-Zr-Ti allay, which is provided with four equally spaced keyhole-shaped slots 403, 404, 405 and 406 along the circumference thereof. The rotors 502 and 602 have the same structure as the rotor 402. These rotors 402, 502 and 602 are mounted on a shaft 51. Four coils 701, 702, 703 and 704 are disposed in the space between the rotors 402 and 502 at positions at which they are interlinked by magnetic flux passing through the opposite slots. Similarly, the coils 801, 802 and 803 are disposed between the rotors 502 and 602.

The constitution of the inhomogeneous hard superconductor in the bearing means 101 and 201 may be provided in the form of a one or more layer disc or a multilayer arrangement of discs and rings, etc., other than the structure as shown in FIG. 3. In a word, it is required that the superconducting bearing has a structure which is capable of forming the dilute magnetic flux space having an axis of symmetry opposite the rotation axis and sufficiently large in size in the divergent magnetic field.

Also, it is obvious that if the rotors and coils are increased in number over those in FIG. 3, and 4, a higher output power or voltage of the generator can be obtained.

It will thus be appreciated that the rotary electric machine according to the present invention can provide a larger capacity than the similar machine utilizing the Meissner effect since it utilizes the magnetic shielding effect of an inhomogeneous hard superconducting material for the non-contact bearings and the electrical efficiency of this machine is improved remarkably as compared with the same type machine having mechanical bearings. Moreover, the size of this machine can be effectively reduced since it uses the field coil for generating the supporting field for the bearings.

While various embodiments of the present invention have been described above, the present invention is in no way limited to such specific embodiments and many changes and modifications may be made therein without departing from the spirit of the present invention.

What is claimed is:

1. A rotary electric machine comprising at least two parallel discoidal rotors attached at right angles to a shaft, said rotors including an inhomogeneous hard superconductor as the essential constituent thereof, at least one armature coil disposed nonconcentrically in the space between said parallel rotors, said rotors in combination having a magnetic shielding property which provides a cyclic magnetic shielding effect derived from said superconductor in said rotors with respect to said armature coil when they are rotated around said shaft in a magnetic field, a superconducting main field coil for externally applying a uniform magnetic field to said rotors in the axial direction of said shaft, superconducting supplemental field coils having the same diameter as said main field coil, said supplemental field coils being placed at the respective ends of said main field coil in coaxial relation with said main field coil with gaps therebetween, two bearing means attached to the respective ends of said shaft and located in the vicinity of the respective gaps between said main and supplemental field coils for forming a dilute magnetic flux space having axial symmetry with respect to said shaft in a divergent magnetic field near the gaps between said main and supplemental field coils, and cooling means for maintaining said rotors, bearings and main and supplemental field coils in a superconducting state.

2. A rotary electric machine comprising at least two parallel discoidal rotors composed of an electrical insulator, a plurality of magnetic poles provided along the circumference of said insulator discs, said magnetic poles being formed of pieces of an inhomogeneous hard superconducting material embedded in the portions of said discs, said rotors being attached to a shaft with the magnetic poles of one of said rotors being opposed by the magnetic poles of the other, said rotors being maintained in the superconducting state so as to form a shield against a magnetic field in the areas at which said magnetic poles exist, at least one armature coil disposed in the space between said rotors at a position at which it is interlinked by magnetic flux passing through the portions of said rotors other than the magnetic pole portions, a cylinder-type vertical superconducting field coil for externally applying a uniform magnetic field to said rotors in the axial direction of said shaft, two bearing means attached to the respective ends of said shaft and located in the vicinity of the respective ends of said field coil for forming a dilute magnetic flux space comprising a plurality of parallel discs of an inhomogeneous hard superconducting material and a plurality of discs of a normal conductive material alternately laminated together, and cooling means for maintaining said rotors, bearing and field coils in a superconducting state.

3. A rotary electric machine comprising at least two parallel discoidal rotors composed of an electrical insulator, a plurality of magnetic poles provided along the circumference of said insulator discs, said magnetic poles being formed of pieces of an inhomogeneous hard superconducting material embedded in the portions of said discs, said rotors being attached to a shaft with the magnetic poles of one of said rotors being opposed by the magnetic poles of the other, said rotors being maintained in the superconducting state so as to form a shield against a magnetic field in the areas at which said magnetic poles exist, at least one armature coil disposed in the space between said rotors at a position at which it is interlinked by magnetic flux passing through the portions of said rotors other than the magnetic pole portions, a cylinder-type vertical superconducting field coil for externally applying a uniform magnetic field to said rotors in the axial direction of said shaft, two bearing means attached to the respective ends of said shaft and located in the vicinity of the respective ends of said field coil for forming a dilute magnetic flux space comprising a plurality of parallel discs and rings interposed between said discs, said discs and rings composed of an inhomogeneous hard superconducting material, and cooling means for maintaining said rotors, bearings and field coils in a superconducting state.

4. A rotary electric machine comprising at least two discoidal rotors composed of an inhomogeneous hard superconducting material, said rotors being provided with a plurality of slots along the circumference thereof and attached to a shaft in parallel with each other in such a manner that the slots of one of said rotors are opposed by the slots of the other, said rotors having such a magnetic property in their superconducting state that they shield against passage of magnetic flux at portions other than the slot portions, at least one armature coil disposed in the space between said parallel rotors, said coil being disposed at a position at which it is interlinked by magnetic flux passing through the slot portions, a cylinder-type superconducting field coil for externally applying a uniform magnetic field to said rotors in the axial direction of said shaft, two bearing means attached to the respective ends of said shaft and located in the vicinity of the respective ends of said field coil, said bearing means comprising a plurality of parallel discs of an inhomogeneous hard superconducting material and a plurality of discs of a normal conductive material alternately laminated together, and cooling means for maintaining said rotors, bearings and field coils in a superconductive state.

5. A rotary electric machine comprising at least two discoidal rotors composed of an inhomogeneous hard superconducting material, said rotors being provided with a plurality of slots along the circumference thereof and attached to a shaft in parallel with each other in such a manner that the slots of one of said rotors are opposed by the slots of the other, said rotors having such a magnetic property in their superconducting state that they shield against passage of magnetic flux at portions other than the slot portions, at least one armature coil disposed in the space between said parallel rotors, said coil being disposed at a position at which it is interlinked by magnetic flux passing through the slot portions, a cylinder-type superconducting field coil for externally applying a uniform magnetic field to said rotors in the axial direction of said shaft, two bearing means attached to the respective ends of said shaft and located in the vicinity of the respective ends of said field coil, said bearing means comprising a plurality of parallel discs and rings interposed between said discs, said discs and rings composed of an inhomogeneous hard superconducting material, and cooling means for maintaining said rotors, bearings and field coil in a superconducting state.

6. A rotary electric machine comprising at least two parallel discoidal rotors composed of an electrical insulator, a plurality of magnetic poles provided along the circumference of said insulator discs, said magnetic poles being formed of pieces of an inhomogeneous hard superconducting material embedded in the portions of said discs, said rotors being attached to a shaft with the magnetic poles of one of said rotors being opposed by the magnetic poles of the other, said rotors being maintained in the superconducting state so as to form a shield against a magnetic field in the areas at which said magnetic poles exist, at least one armature coil disposed in the space between said rotors at a position at which is is interlinked by magnetic flux passing through the portions of said rotors other than the magnetic pole portions, a cylinder-type vertical superconducting main field coil for externally applying a uniform magnetic field to said rotors in the axial direction of said shaft, two superconducting supplemental field coils having the same diameter as said main field coil, said supplemental field coils being placed at the respective ends of said main field coil in coaxial relation with said main field coil with gaps therebetween, two bearing means attached to the respective ends of said shaft and located in the vicinity of the respective gaps between said main and supplemental field coils for forming a dilute magnetic flux space comprising at least one layer composed of an inhomogeneous hard superconducting material, and cooling means for maintaining said rotors, bearings and field coils in a superconducting state.

7. A rotary electric machine as claimed in claim 6, wherein said bearing means comprise a plurality of parallel discs of an inhomogeneous hard superconducting material and a plurality of discs of a normal conductive material alternately laminated together.

8. A rotary electric machine as claimed in claim 6, wherein said bearing means comprise a plurality of parallel discs and rings being interposed between said discs, and said discs and rings are composed of an inhomogeneous hard superconducting material.

9. A rotary electric machine comprising at least two discoidal rotors composed of an inhomogeneous hard superconducting material, said rotors being provided with a plurality of slots along the circumference thereof and attached to a shaft in parallel with each other in such a manner that the slots of one of said rotors are opposed by the slots of the other, said rotors having such a magnetic property in their superconducting state that they shield against passage of magnetic flux at portions other than the slot portions, at least one armature coil disposed in the space between said parallel rotors, said coil being disposed at a position at which it is interlinked by magnetic flux passing through the slot portions, a cylinder-type vertical main superconducting field coil for externally applying a uniform magnetic field to said rotors in the axial direction of said shaft, two superconducting supplemental field coils having the same diameter as said main field coil, said supplemental field coils being placed at the respective ends of said main field coil in coaxial relation with said main field coil with gaps therebetween, two bearing means attached to the respective ends of said shaft and located in the vicinity of the respective gaps between said main and supplemental field coils, said bearing means comprising at least one layer composed of an inhomogeneous hard superconducting material, and cooling means for maintaining said rotors, bearings and field coils in a superconducting state.

10. A rotary electric machine as claimed in claim 9, wherein said bearing means comprise a plurality of parallel discs of an inhomogeneous hard superconducting material and a plurality of discs of a normal conductive material alternately laminated together.

11. A rotary electric machine as claimed in claim 9, wherein said bearing means comprise a plurality of parallel discs and rings interposed between said discs, and said discs and rings are composed of an inhomogeneous hard superconducting material.

* * * * *